United States Patent
Kim et al.

(10) Patent No.: US 10,461,990 B2
(45) Date of Patent: Oct. 29, 2019

(54) DIAGNOSTIC TRAFFIC GENERATION FOR AUTOMATIC TESTING AND TROUBLESHOOTING

(71) Applicant: AT&T Intellectual Property I, L.P., Atlanta, GA (US)

(72) Inventors: Byoung-Jo Kim, Morganville, NJ (US); Yang Xu, Basking Ridge, NJ (US); Muhammad Bilal Anwer, Branchburg, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/908,302

(22) Filed: Feb. 28, 2018

(65) Prior Publication Data

US 2018/0324031 A1 Nov. 8, 2018

Related U.S. Application Data (63) Continuation of application No. 15/584,696, filed on May 2, 2017, now Pat. No. 9,935,818.

(51) Int. Cl.
*H04L 12/24* (2006.01)
*H04L 12/26* (2006.01)
*H04M 3/32* (2006.01)
*H04M 3/42* (2006.01)

(52) U.S. Cl.
CPC ...... *H04L 41/0645* (2013.01); *H04L 41/0681* (2013.01); *H04L 43/0888* (2013.01); *H04L 43/0894* (2013.01); *H04L 43/50* (2013.01); *H04M 3/323* (2013.01); *H04L 41/12* (2013.01); *H04L 43/0829* (2013.01); *H04L 43/16* (2013.01); *H04M 3/42221* (2013.01)

(58) Field of Classification Search
CPC ... H04L 41/12; H04L 41/5038; H04L 43/026; H04L 43/10; H04L 43/50; H04L 13/12; G06F 17/30241; G06F 17/3053; G06F 17/30554; G06F 17/30598; G06F 17/30604; Y02D 50/30
USPC ........... 379/1.01, 9, 9.01, 9.02, 9.04, 10.01, 379/10.02, 15.01, 32.01, 111, 112.01, 379/112.04, 112.1, 133, 135, 112.05, 379/112.06
See application file for complete search history.

(56) References Cited

U.S. PATENT DOCUMENTS

| 5,488,648 A | 1/1996 | Womble |
| 5,867,558 A | 2/1999 | Swanson |
| 6,937,712 B2 | 8/2005 | Lemchen et al. |

(Continued)

FOREIGN PATENT DOCUMENTS

| WO | WO 2015/109443 A1 | 7/2015 |
| WO | WO 2016/161127 A1 | 10/2016 |

OTHER PUBLICATIONS

Wang et al.; "A tool for tracing network data plane via SDN/OpenFlow"; Science China Information Sciences; vol. 60; Feb. 2017; 13 pages.

*Primary Examiner* — Binh Kien Tieu
(74) *Attorney, Agent, or Firm* — BakerHostetler (57) ABSTRACT

A framework in a cloud network that may allow for debugging at multiple vantage points at different layers (e.g., layer 2, layer 3, etc.). The methods may provide tracer or measurement services that filter, capture, or forward flows that may include packets, calls, or protocols to look for particular signatures.

20 Claims, 9 Drawing Sheets

(56) References Cited

U.S. PATENT DOCUMENTS

| | | | |
|---|---|---|---|
| 7,577,738 B1 * | 8/2009 | Inglis | H04L 43/12 |
| | | | 370/254 |
| 8,335,678 B2 | 12/2012 | Hughes et al. | |
| 8,515,015 B2 * | 8/2013 | Maffre | H04L 43/50 |
| | | | 379/10.01 |
| 9,300,562 B2 | 3/2016 | Dufour et al. | |
| 9,354,997 B2 * | 5/2016 | Marr | G06F 11/30 |
| 9,467,330 B2 | 10/2016 | Stuart | |
| 9,503,228 B2 | 11/2016 | Subhedar et al. | |
| 9,503,344 B2 | 11/2016 | Chakrabarti et al. | |
| 9,537,741 B2 | 1/2017 | Chakrabarti et al. | |
| 2009/0035740 A1 | 2/2009 | Reed et al. | |
| 2009/0114877 A1 | 5/2009 | Negi et al. | |
| 2009/0276200 A1 | 11/2009 | Beyer et al. | |
| 2010/0268834 A1 | 10/2010 | Eidelman et al. | |
| 2013/0090905 A1 | 4/2013 | Gupta et al. | |
| 2014/0114644 A1 | 4/2014 | Smith et al. | |
| 2014/0289405 A1 * | 9/2014 | Tychon | H04L 41/5038 |
| | | | 709/224 |
| 2014/0337674 A1 | 11/2014 | Ivancic et al. | |
| 2015/0234725 A1 | 8/2015 | Cillis et al. | |
| 2016/0043944 A1 | 2/2016 | Felstaine et al. | |
| 2016/0048679 A1 * | 2/2016 | Lutas | G06F 21/554 |
| | | | 726/23 |
| 2016/0301582 A1 | 10/2016 | Arndt et al. | |
| 2016/0301601 A1 | 10/2016 | Anand et al. | |
| 2016/0359878 A1 * | 12/2016 | Prasad | H04L 63/1425 |
| 2017/0026276 A1 | 1/2017 | Dearien et al. | |
| 2017/0279824 A1 * | 9/2017 | Haugsnes | G06F 16/24 |
| 2017/0324609 A1 | 11/2017 | Hong et al. | |
| 2018/0287856 A1 * | 10/2018 | Whitner | H04L 67/10 |

* cited by examiner

DIAGNOSTIC TRAFFIC GENERATION FOR AUTOMATIC TESTING AND TROUBLESHOOTING

CROSS-REFERENCE TO RELATED APPLICATIONS

This application is a continuation of and claims the benefit of U.S. patent application Ser. No. 15/584,696, filed on May 2, 2017, entitled "Diagnostic Traffic Generation For Automatic Testing And Troubleshooting," the contents of which are hereby incorporated by reference herein in its entirety.

TECHNICAL FIELD

The technical field generally relates to software-defined networks and, more specifically, to testing in software-defined networks.

BACKGROUND

Communication networks have migrated from using specialized networking equipment executing on dedicated hardware, like routers, firewalls, and gateways, to virtualized network components, such as virtual network functions (VNF) and virtual machines (VM) that may be implemented or run on general purpose hardware within a cloud infrastructure. Network management of network components—whether or not virtualized—may require implementing, from time to time, software changes across the network or across a subset of the network components. These software changes may include software patches, software updates, configuration changes, or installation/uninstallation of software. In the complex computing environment today there are challenges with troubleshooting network issues that may be based on these software changes.

SUMMARY

Disclosed herein is a framework for diagnostic traffic generation for automatic testing and troubleshooting. Software-defined tracing and measurement (SDTM), as disclosed herein, may allow for debugging at multiple vantage points at different layers (e.g., layer 2, layer 3, etc.). Advanced measurements apps may emulate or talk to virtual network functions to generate calls or packets or provide backend service for interactive exploration or analysis of collected data.

In an example, an apparatus may include a processor and a memory coupled with the processor that effectuates operations. The operations may include detecting an event associated with communication between a first device (e.g., a mobile device) and a second device (e.g., cloud sever) during a first period. Based on detecting the event, providing instructions to record operations by the first device or second device for a second period; and based on the recorded operations, providing instructions to install a virtual machine for generating test traffic that simulates the recorded traffic of the second period on the first device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
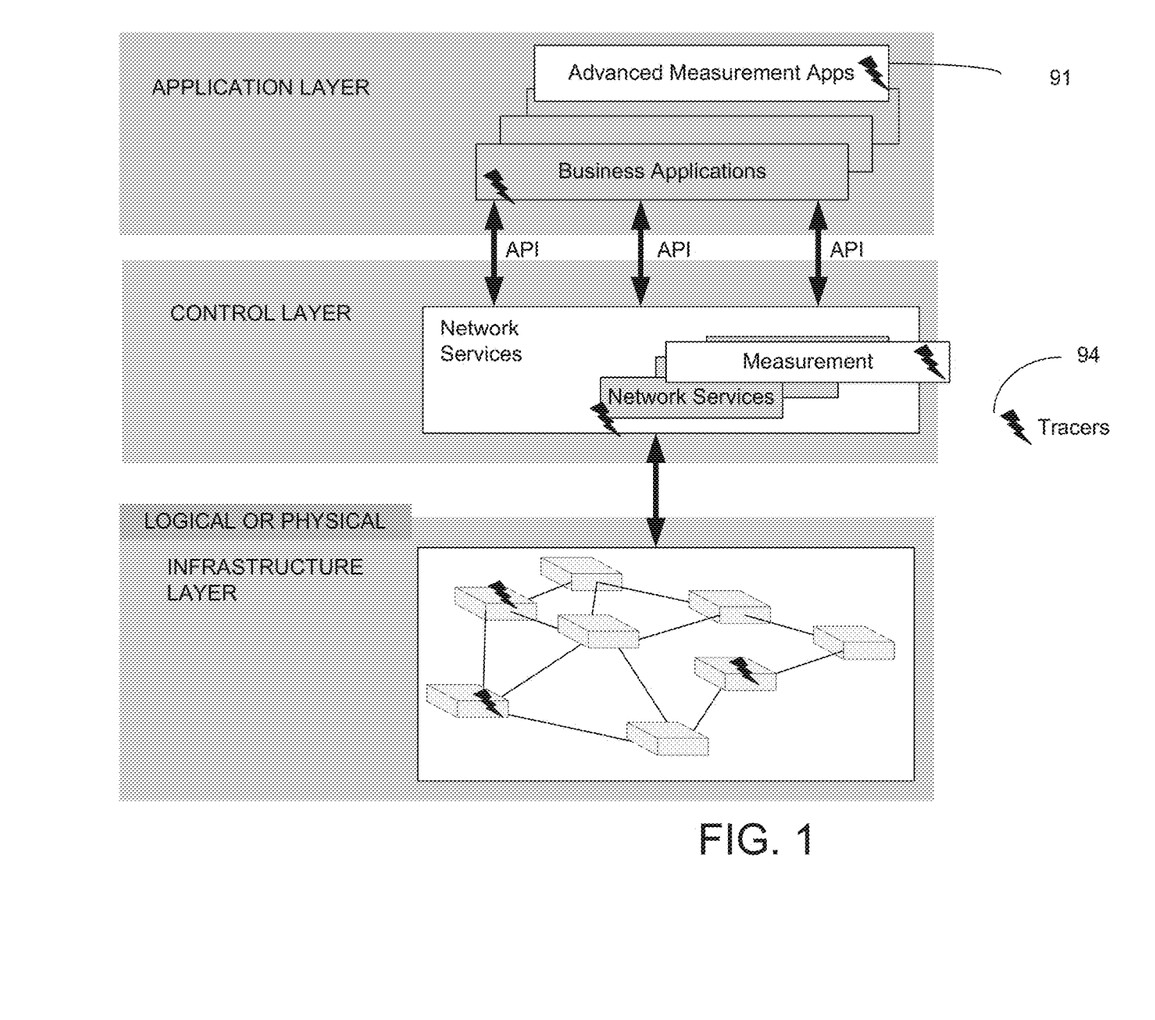
FIG. 1 illustrates an exemplary layer and function implementation for software-defined tracing and measurement.

With the development of software defined networks (SDNs), there are an increasing number indirections, service chaining, application programming interfaces (APIs), and layering which may create more need to independently verify connectivity, service path, or performance. Disclosed herein is a framework for debugging of operational use cases in that may be in a SDN. Software-defined tracing and measurement (SDTM), as disclosed herein, may allow for debugging at multiple vantage points at different layers (e.g., layer 2, layer 3, etc.), such as shown in FIG. 1. SDTM (e.g., diagnostic traffic generation for automatic testing and troubleshooting) may allow for tracing and measuring that may be run as a virtual network function (VNF) with flexibility and scale. SDTM service may provide tracer services that filter, capture, or forward flows that may include packets (e.g., requests or responses), commands, calls, or protocols to look for particular signatures. Tracers 94 may be invoked on-demand to generate test traffic. SDTM service may provide measurement services that may include deploying or controlling tracers (and collecting results), deducing expected topologies or connectivity to verify independently or interface with standard stats from other systems and network devices. Advanced measurements apps 91 (e.g., FIG. 1) may 1) may emulate or talk to virtual network functions to generate calls or packets; 2) provide backend service for interactive exploration or analysis of collected data; or 3) automate measurement or tracing operations.

Figure 2:
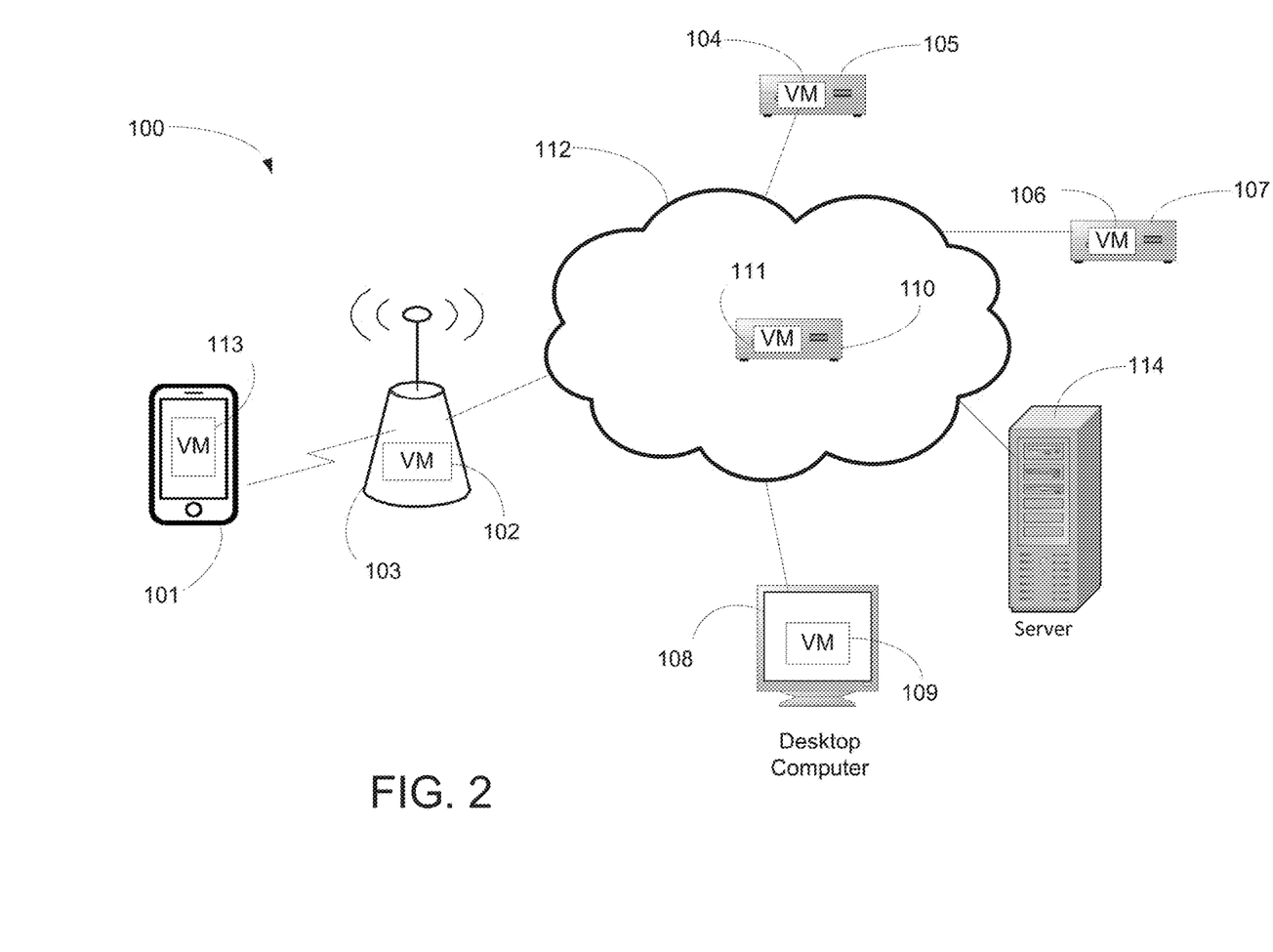
FIG. 2 illustrates an exemplary system that may implement software-defined tracing and measurement.

FIG. 2 illustrates an exemplary system 100 that may implement VNF diagnostic traffic generation for automatic testing and troubleshooting. In system 100, there may be a communications network 112 that may connect several devices. Exemplary devices may include switch 104, switch 107, router 110, base station 103, mobile device 101, desktop computer 104, or server 114. Each device may include a hypervisor or the like that may be used to generate a virtual machine (VM) and corresponding virtual network functions (VNF). For example, there may be VM 113 in mobile device 101, VM 102 in base station 103, VM 104 in switch 105, VM 106 in switch 107, VM 110 in router 111, and VM 108 in desktop computer 109. As provided in more detail herein, VMs may be dynamically generated or removed, as needed.

Figure 3:
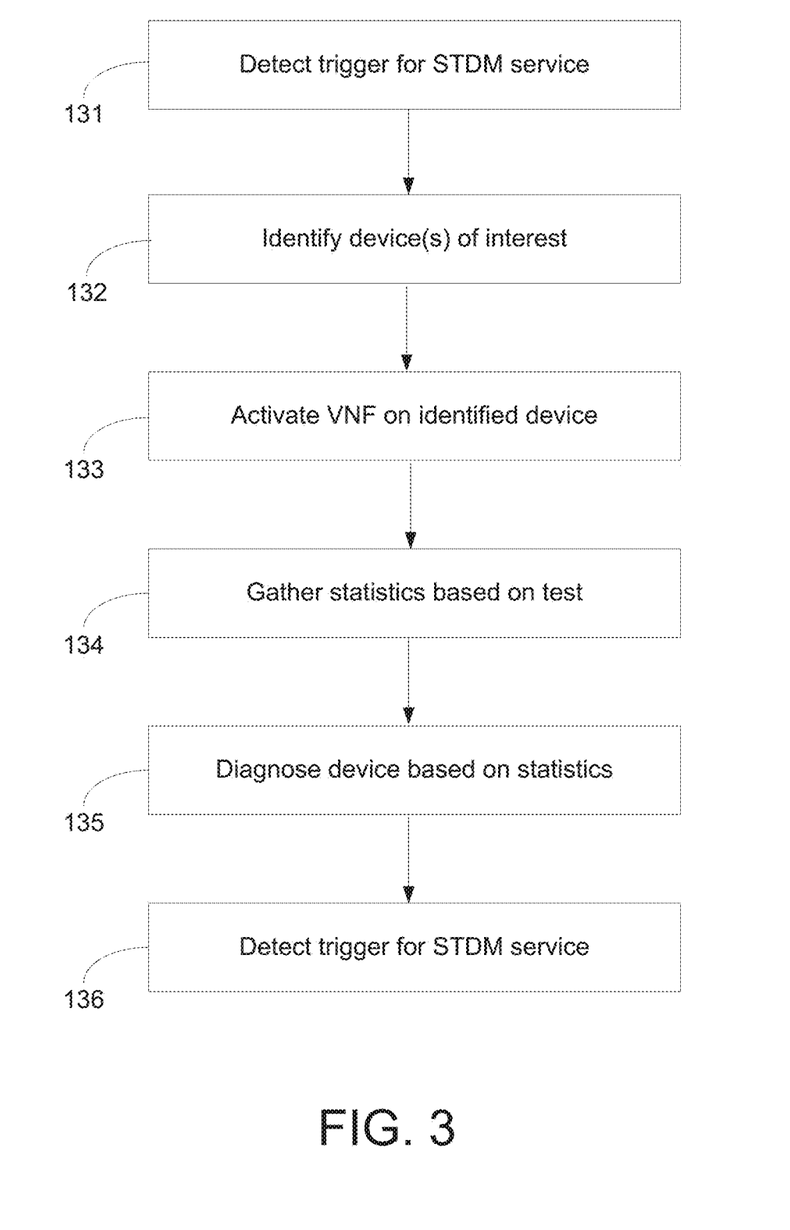
FIG. 3 illustrates an exemplary method for software-defined tracing and measurement.

FIG. 3 illustrates an exemplary method for implementing software-defined tracing and measurements (SDTM) as disclosed herein. At step 131, server 114 may detect an event that triggers SDTM service. Events that may trigger SDTM services for step 131 may be based on types of packets traversing a network (e.g., network 112), types of errors, reaching a threshold error rate, reaching a threshold traffic load, reaching a threshold packet loss, number of times an application resets or crashes, an operating system change (e.g., version), a network device change (e.g., hardware or software version), indication of a type of customer complaint, reaching a threshold number of customer complaints, date, time, location of a device (e.g., mobile device 101), a billing issue, or a request from an administrator (e.g., user), among other things.

At step 132, based on the event of step 131, server 114 may determine one or more devices of interest, which may be further based on network paths of interest (e.g., one or more communication paths for uploading or downloading data). For example, in FIG. 2, cloud server 105, mobile device 101, or desktop computer 109 may be identified as devices of interest based on detecting threshold number of errors. At step 133, server 114 may provide instructions for a VM or VNF to be activated on the one or more devices of interest. Activating the VM in step 133 may include providing instructions to generate a VM (or VNF) that was not already instantiated on the one more devices of interest or providing instructions to configure a VM already on the one or more devices to process or generate traffic for testing based on the situation. In an example, VM 102 may be configured to generate a particular type of traffic or process data as if it were a particular type of device (e.g., a mobile device or gaming server) running a particular type of application (e.g., online gaming application). In another example, VM 113 may generate data or functions that emulate processes that occurred when communicating with or through VM 102. In this example, VM 102 may be an instantiated test process that simulates the functions of another VM or be the normal VM 102 not instantiated for testing purposes.

With continued reference to FIG. 3, at step 134, server 114 may provide instructions for VM 113 on mobile device 101 and other VMs of interest to generate or otherwise process test traffic using the SDTM service for a test period. At step 135, server 114 may obtain statistical information associated with the test period of step 134. The statistical information may include network performance statistics, accounting data for the purpose of billing, usage data of the network or devices in the network. At step 136, server 114, based on the statistics of step 135, may determine that one or more devices, network paths, or software applications, for example, are the source of a problem.

Figure 4:
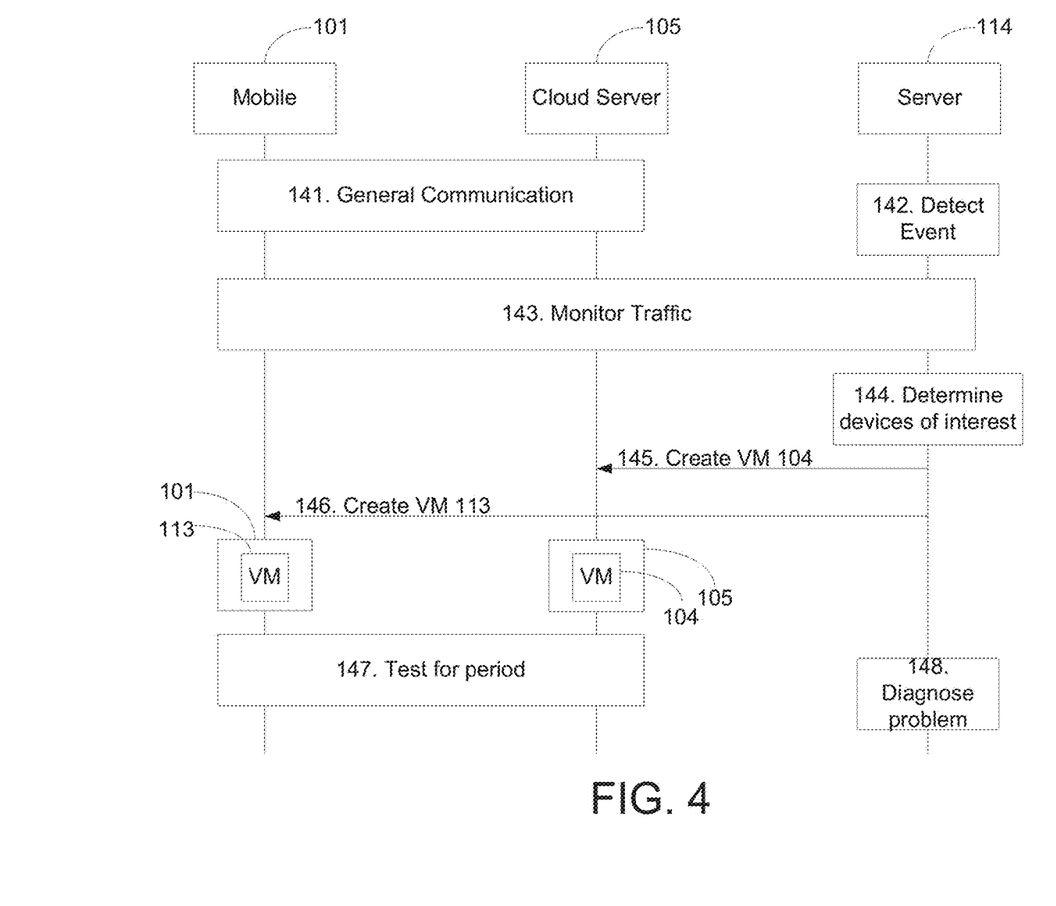
FIG. 4 illustrates an exemplary method flow for software-defined tracing and measurement.

FIG. 4 illustrates an exemplary method flow for a scenario implementing VNF diagnostic traffic generation for automatic testing and troubleshooting disclosed herein. At step 141 there may be general communication between mobile device 101 and cloud server 105. Exemplary communications may be associated with e-mail, gaming, or cloud networking services, among other things. At step 142, server 141 may detect an event. In an example, server 114 may periodically check statistical information associated with the general communication for mobile device 101 and cloud server 105 may send a message to server 114 upon detecting the event. This event may be any event, such as the events disclosed herein with reference to FIG. 3. At step 143, based on the event, server 114 may monitor or record the network traffic (or "operations" which is a term that may generally be substituted for "traffic" as disclosed herein) of mobile device 101, cloud server 105, or other devices along the communication path or tangentially effect the communication between mobile device 101 and cloud server 105, such as base station 103 or router 110. The recorded operations may include commands or messages sent or otherwise executed by mobile device 101 or cloud server 105. The operations or traffic may include packets (e.g., requests or responses), commands, calls, or protocols. At step 144, based on the event of step 142 or the monitored (or recorded) traffic of step 143, server 114 may determine devices of interest to generate test traffic. The test traffic may specifically mimic the commands recorded in step 143 or may generally simulate traffic associated with applications of the type of mobile device 101 or cloud server 105. The general simulation, for example, may be a random selection of operations based on the average (or median or mode, etc.) location or other event of mobile device, cloud server, or other device of interest. Here, for example, it is determined that mobile device 101 and cloud server 105 are the devices of interest (e.g., devices that generate traffic for the SDTM service). It is contemplated herein that other devices may be selected, such as the other devices of system 100. The devices of interest may be determined based on multiple factors. Factors include the events of step 142 or step 143, or otherwise disclosed herein. Another exemplary factor may include a determination of the location, such as farthest device closest to the originator of traffic that has the device capabilities (e.g., processor speed, memory amount, bandwidth of network connection, power to the device, etc.) of creating a VM for test traffic or generating test traffic. Another example, with regard to location, may be associated with the base station in which mobile device is connected or not connected with. Another factor may be based on the intersection of complaints (or detected errors) associated with a plurality of users. For example, base station 103 may be selected over mobile device 101 based on an intersection of complaints (e.g., the device that is commonly involved in different situations) or device capability.

With continued reference to FIG. 4, at step 145 and step 146, server 114 may send a message to cloud server 105 or may send a message to mobile device 101 to create VM 104 of cloud server 105 or VM 113 of mobile device 101 for generating or processing test traffic. Scenarios are contemplated herein in which VM 113 may be created particularly for generating test traffic for the SDTM service, while cloud server 105 does not create another VM (e.g., uses a previously instantiated VM used for testing) or cloud server 105 processes messages from VM 113 as it would for any other device (e.g., a VM of cloud server 105 already serving real traffic and is not generally aware that it is test traffic). At this step 145 or step 146, server 115 may also provide instructions for the created VMS to mark the test traffic in order to recognize it at a later point in time (e.g., diagnosis at step 148). In addition, server 114 may provide instructions to create VM or generate test traffic during a particular period. The particular period may be a period of relatively low network traffic or device usage, in order to minimize impact to a user. Or the particular period may be period of relatively high traffic or device usage, in order to more effectively diagnose problems that occur during those periods of relatively high traffic or device usage.

At step 147, tests (e.g., generation of traffic and monitoring results) may occur between mobile device 101 and cloud server 105 for a period that may have been communicated at step 145 or step 146. It is contemplated herein per-hop one-way active or passive performance measurements on each hop using the same ports and protocols as in ordinary traffic (e.g., simulate traffic that is processed as normal, but measured more discretely). At step 148, server 114 may determine possible issues that may have caused a previous problem (e.g., problem experienced and reported by a user associated with mobile device 101), may determine possible issues that may cause a problem for mobile device 101 (or cloud server 105) in the future (e.g., after installation of a software update), or other indicators associated with health of the entire or subset of system 100. Subsequently server 114 may provide instructions to display the determined results or transmit the results of the diagnosis of step 148 to a device.

Figure 5:
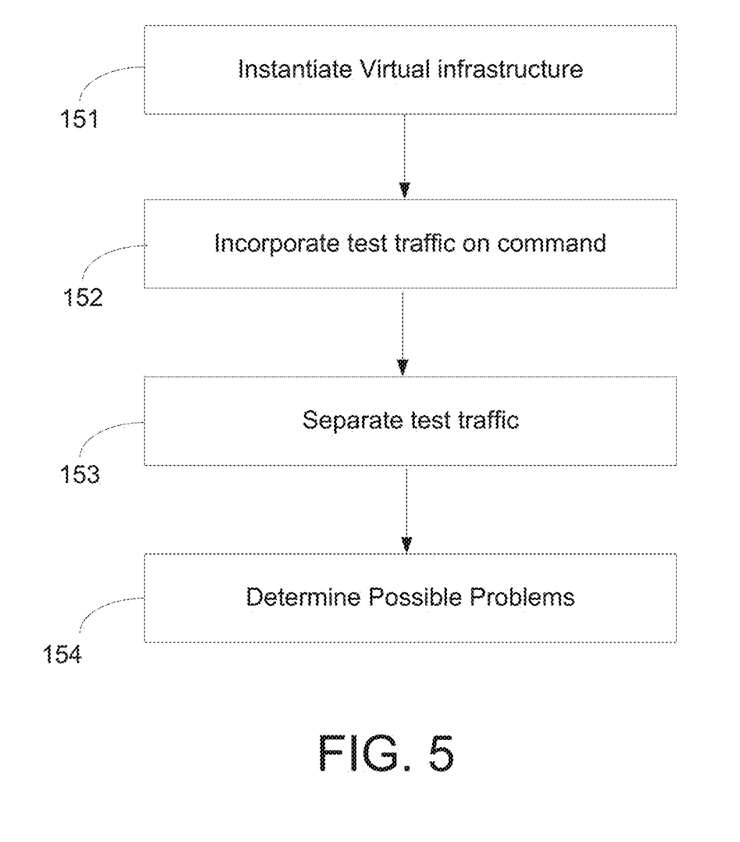
FIG. 5 illustrates an exemplary method for software-defined tracing and measurement.

FIG. 5 illustrates another exemplary method for implementation of SDTM. At step 151, Openstack (or the like) may be used to instantiate virtual infrastructure (e.g., VMs) and inject or capture test traffic. For example, VMs and VNFs may be placed within mobile device 101, base station 103, router 111, and desktop computer 109 for testing. This step 151 may be proactive testing of system 100 and may not be in response to a detected error. This method (or methods herein) may be a periodic (e.g., may occur at peak times or alternatively non-peak times). At step 152, a library may be created for other VNFs to incorporate test traffic generation on command. For example, libraries to implement SDTM may be created in existing or new VNFs. At step 153, vRouter (or the like) may separate test traffic (e.g., injected traffic) from real traffic (e.g., normal traffic from users). At step 154, using instantiated VMs of step 152 in the context of SDTM to determine possible problems and suggest solutions (e.g., a configuration window may pop-up with a highlighted possible configuration at issue) or provide an indication that there are no detected problems. In other words, at step 154, the health of system 100 may be determined and communicated.

It is contemplated herein that one or more steps of SDTM (e.g., FIG. 3, FIG. 4, or FIG. 5) may occur on one device or may be distributed across multiple devices. Exemplary devices that may execute the disclosed methods may include an operation, administration and maintenance (OAM) server, SDN controller, router, or switch, among other things. In an exemplary implementation, distributed processing and data structures or algorithms may be used to reduce the collection traffic.

Figure 6:
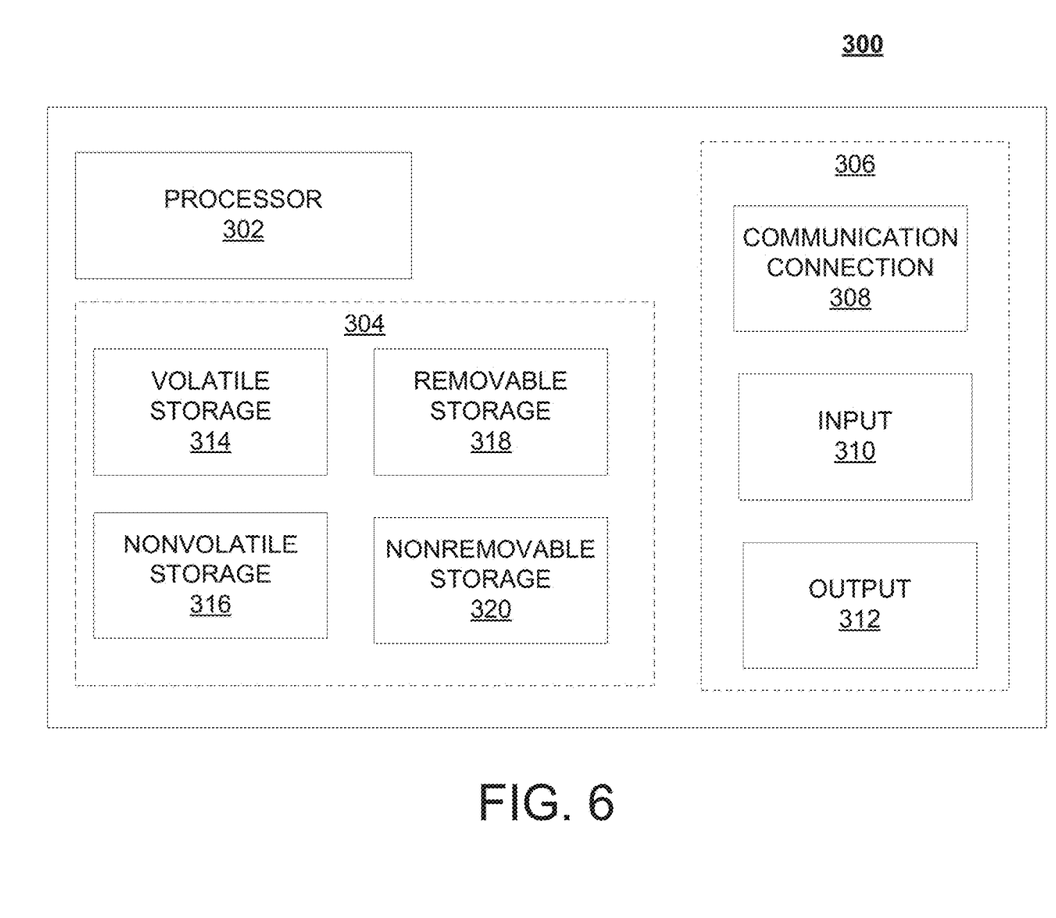
FIG. 6 illustrates a schematic of an exemplary network device.

FIG. 6 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
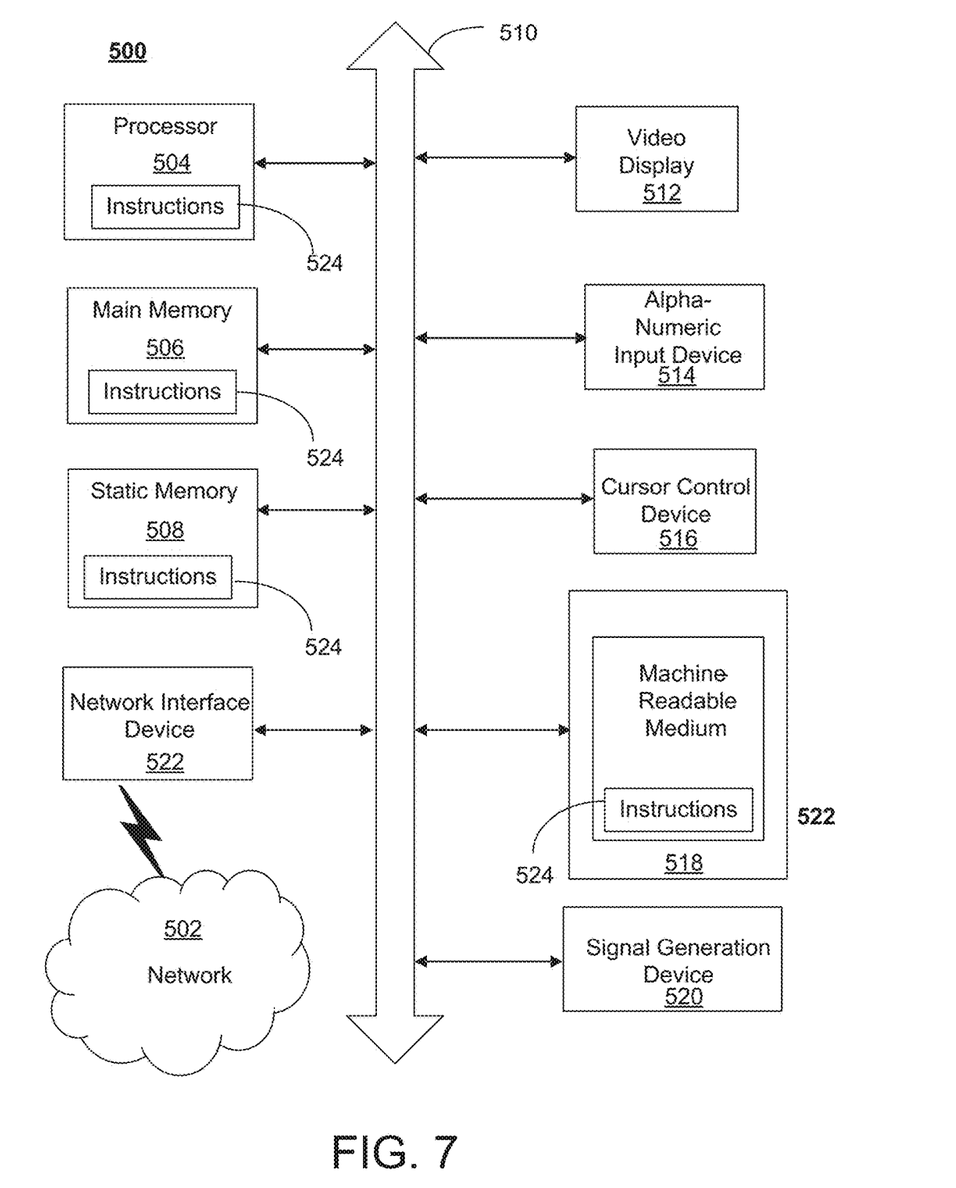
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, server 114, cloud server 105, switch 107, and other devices of FIG. 2. In some embodiments, the machine may be connected (e.g., using a network 100) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 8A:
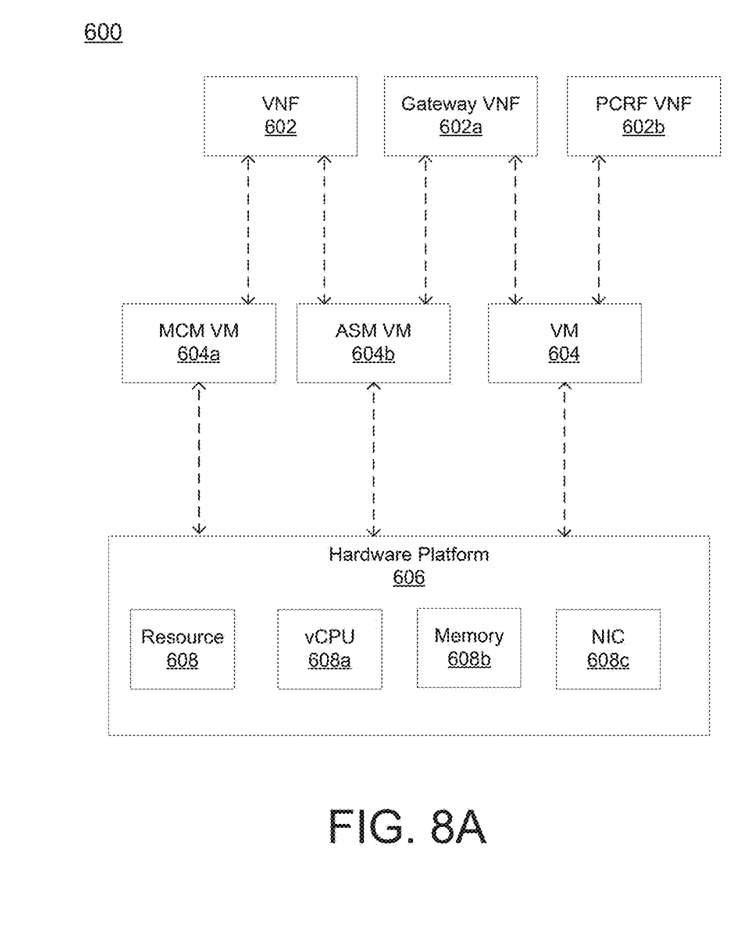
FIG. 8A is a representation of an exemplary network.

FIG. 8A is a representation of an exemplary network 600. Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 8A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 8A illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 8B:
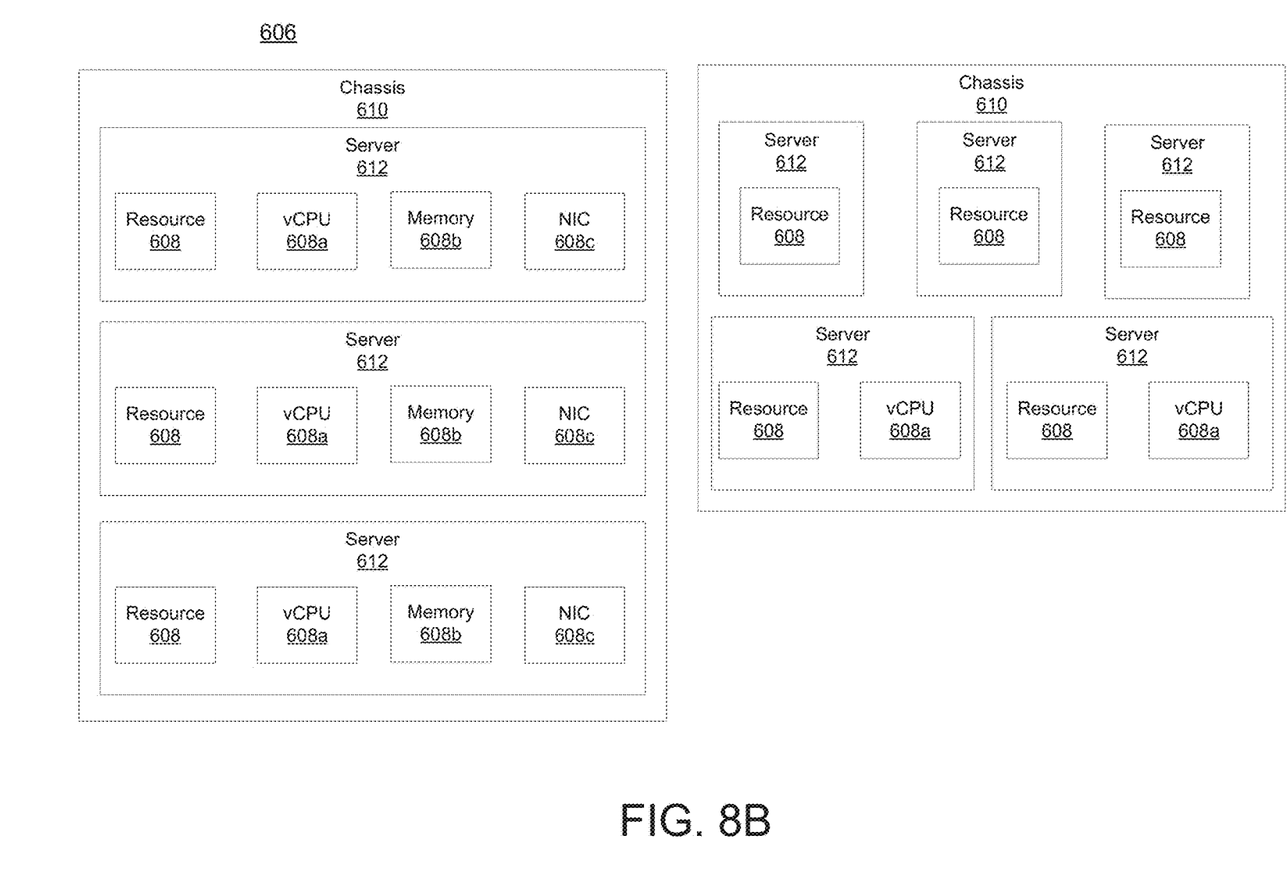
FIG. 8B is a representation of an exemplary hardware platform for a network.

While FIG. 8A illustrates resources 608 as collectively contained in hardware platform 606, the configuration of hardware platform 606 may isolate, for example, certain memory 608c from other memory 608c. FIG. 8B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 8B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which diagnostic traffic generation for automatic testing and troubleshooting may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—diagnostic traffic generation for automatic testing and troubleshooting—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. It is contemplated that steps of FIG. 3, FIG. 4, or FIG. 5, for example, may be skipped or combined.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   a memory coupled with the processor, the memory comprising executable instructions stored thereon that when executed by the processor cause the processor to effectuate operations comprising:
   detecting an occurrence of an event;
   based on the detected occurrence of the event, activating a virtual machine, wherein said activating a virtual machine comprises providing instructions to generate the virtual machine to be instantiated on one or more devices or providing instructions to configure a virtual machine already instantiated on one or more devices;
   obtaining the network traffic using the activated virtual machine, wherein the network traffic comprises test traffic and normal traffic;
   separating the test traffic and the normal traffic using the virtual machine; and
   based on the separated test traffic, determining health of a system.

2. The apparatus of claim 1, wherein the virtual machine emulates a mobile device.

3. The apparatus of claim 1, wherein the virtual machine generates a first type of test traffic for a remote virtual machine.

4. The apparatus of claim 1, wherein the detected event is a number of times the application resets.

5. The apparatus of claim 1, wherein the detected event is on reaching a threshold number of customer complaints.

6. The apparatus of claim 1, wherein the detected event is a change of hardware of a network device.

7. The apparatus of claim 1, wherein the system comprises a subset of a network component.

8. The apparatus of claim 1, the operations further comprising:
identifying a remote device of interest based on a threshold number of errors; and
providing instructions to activate a virtual machine on the remote device in order to generate test traffic.

9. The apparatus of claim 1, the operations further comprising providing instructions to display the health of the system, which comprises diagnosed problems with the system.

10. A method comprising:
detecting an occurrence of an event;
activating a virtual machine based on the event, wherein said activating a virtual machine comprises providing instructions to generate the virtual machine to be instantiated on one or more devices or providing instructions to configure a virtual machine already instantiated on one or more devices;
obtaining the network traffic using the activated virtual machine, wherein the network traffic comprises test traffic and normal traffic;
separating the test traffic and the normal traffic using the virtual machine; and
based on the separated test traffic, determining health of a system.

11. The method of claim 10, the operations further comprising providing instructions to display the health of the system, which comprises diagnosed problems with the system.

12. The method of claim 10, wherein the virtual machine emulates a mobile device.

13. The method of claim 10, wherein activating the virtual machine generates a first type of test traffic for a remote virtual machine.

14. The method of claim 10, wherein the detected event is a number of times the application resets.

15. The method of claim 10, wherein the detected event is reaching a threshold number of customer complaints.

16. The method of claim 10, wherein the detected event is a change of hardware of a network device.

17. The method of claim 10, wherein the system comprises a subset of a network component.

18. A computer readable storage medium storing computer executable instructions that when executed by a computing device cause said computing device to effectuate operations comprising:
detecting an occurrence of an event;
activating a virtual machine based on the event, wherein said activating a virtual machine comprises providing instructions to generate the virtual machine to be instantiated on one or more devices or providing instructions to configure a virtual machine already instantiated on one or more devices;
obtaining network traffic using the activated virtual machine, wherein the network traffic comprises test traffic and normal traffic;
separating the test traffic and the normal traffic using the virtual machine; and
based on the separated test traffic, determining health of a system.

19. The computer readable storage medium of claim 18, wherein the virtual machine emulates a mobile device.

20. The computer readable storage medium of claim 18, wherein the detected event is a change of software version on a network device.

* * * * *